UNITED STATES PATENT OFFICE.

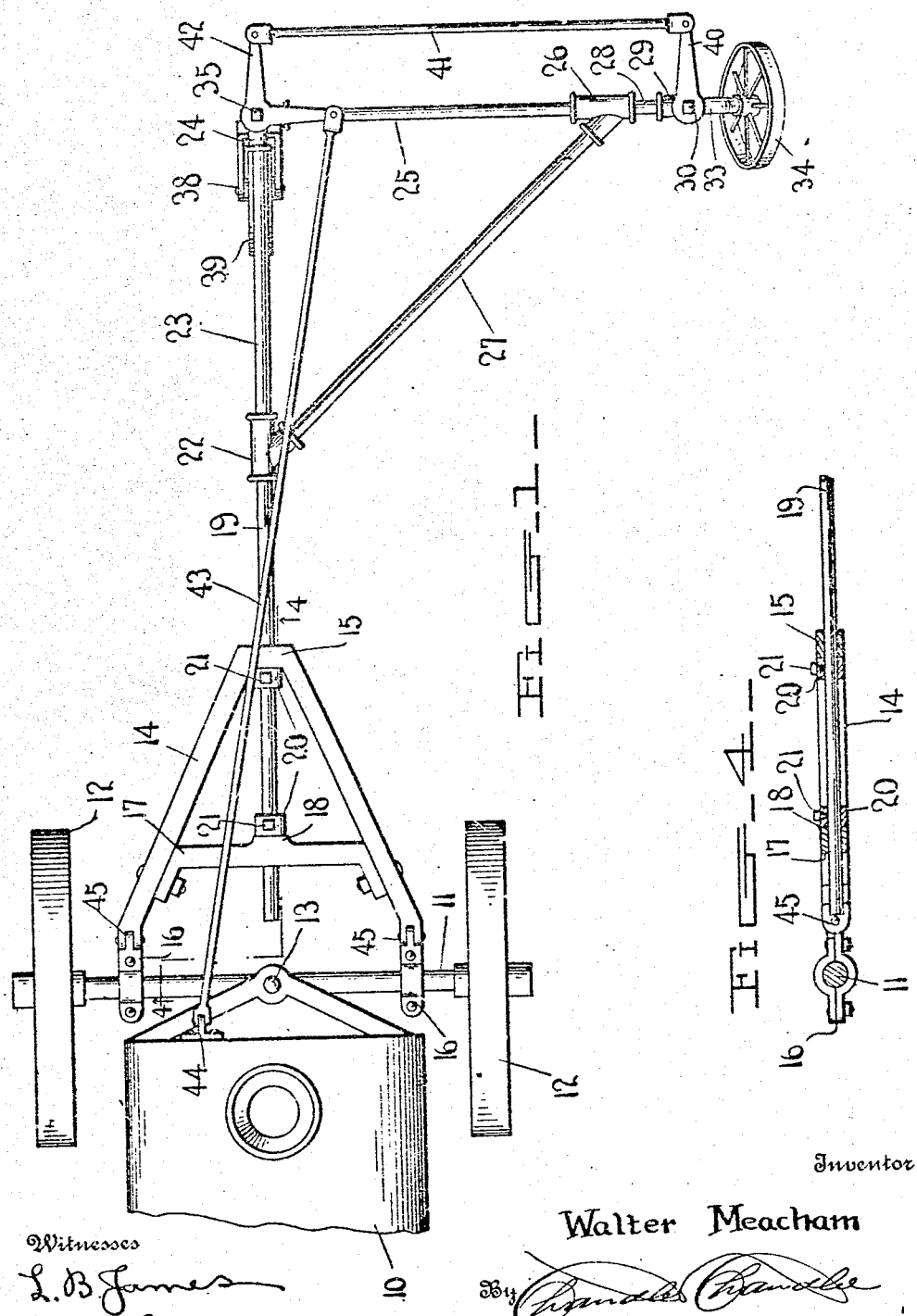

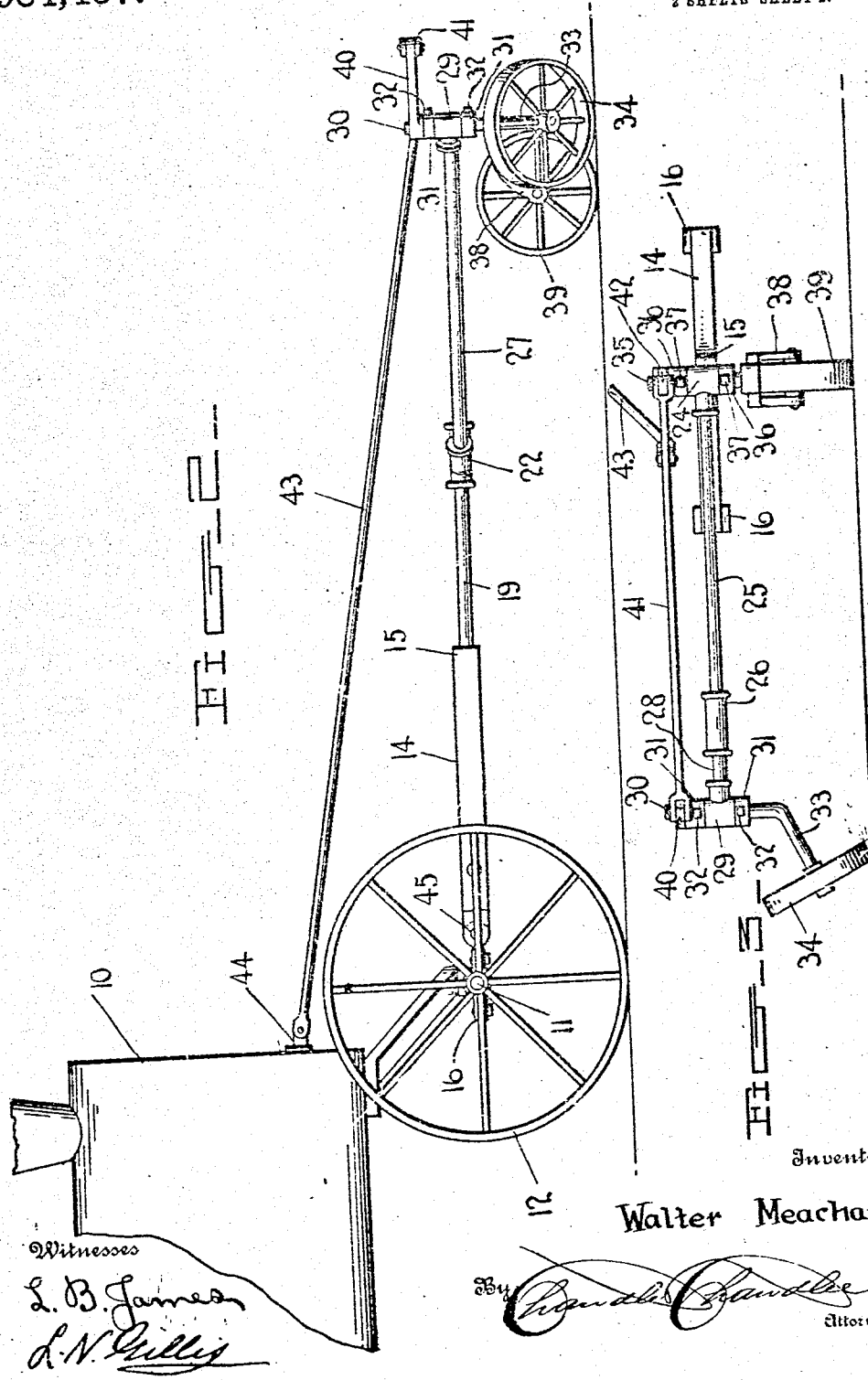

WALTER MEACHAM, OF CONDE, SOUTH DAKOTA.

GUIDE FOR TRACTION-ENGINES.

981,437. Specification of Letters Patent. Patented Feb. 14, 1911.

Application filed June 7, 1910. Serial No. 565,525.

*To all whom it may concern:*

Be it known that I, WALTER MEACHAM, a citizen of the United States, residing at Conde, in the county of Spink, State of South Dakota, have invented certain new and useful Improvements in Guides for Traction-Engines; and I do hereby declare the following to be a full, clear, and exact description of the invention, such as will enable others skilled in the art to which it appertains to make and use the same.

This invention relates to traction engines such as are used for the purpose of drawing gang plows and the like over fields to be farmed.

The invention more especially relates to an attachment for such an engine arranged to afford a means for guiding the traction engine across such a field.

One object of the invention is to provide an improved general construction of devices of this description.

With the above and other objects in view, the invention consists in general of an attachment for traction engines comprising certain novel details of construction and combinations of parts hereinafter fully described, illustrated in the accompanying drawings, and specifically set forth in the claims.

In the accompanying drawings, like characters of reference indicate like parts in the several views, and:—Figure 1 is a plan view of a portion of a traction engine showing the device applied thereto, the major portion of the traction engine being indicated for the purpose of bringing out clearly the manner in which the device is applied. Fig. 2 is a side elevation thereof. Fig. 3 is a detail end view of the device removed from the traction engine. Fig. 4 is a section on the line 4—4 of Fig. 1.

The traction engine is indicated in general by the numeral 10 and this engine is provided with the usual steering axle 11 whereon are mounted the steering wheels 12. This axle is secured to the front of the engine by the usual center pin 13 so that it may be swiveled to assume various positions with reference to the center line of the engine.

The attachment comprises a V-shaped frame 14 having a blunt apex 15 provided with an opening therethrough. The ends of the legs of this frame are provided with clamps 16 which are secured over the axle 11 so that the frame is fixed firmly on said axle. At 17 is a brace bar which connects said legs intermediate their ends and is provided with a central boss 18 through which is made an opening alined with the opening 15 in the apex of the frame. Through the openings thus formed extends a shaft 19 formed of a section of pipe and on this shaft are collars 20 provided with set screws 21 to secure them firmly to the shaft. These collars serve to hold the shaft in the frame while at the same time they permit it to revolve in the openings previously described.

At 22 is a pipe wye which is screwed on to the end of the shaft section 19. Screwed into this pipe wye is a pipe section 23 which forms a continuation of the shaft 19 and which carries at its outer end an angled pipe cross 24. Screwed into this pipe cross is a lateral member 25 likewise composed of a pipe section and on the end of this lateral member is a pipe wye 26, the branches of the wyes 22 and 26 being alined and connected by a brace member 27 likewise formed of a section of piping. Extending from the pipe wye 26 is a pipe section 28 which forms an extension of the section 25. On the end of this section 28 is a tee 29. Extending downward through the body of the tee 29 is a standard 30 which is held in position in the tee by means of collars 31 secured to the standard by set screws 32. On the lower end this standard is bent to form an arm 33 which serves to support a guide wheel 34. Extending downward through the cross 24 is a standard 35 secured in the cross by means of collars 36 held on the standard by set screws 37. On the lower end of this standard is secured a fork 38 between the arms of which revolves a ground wheel 39, this wheel serving to support the forward end of the structure.

On top of the standard 30 is secured a forwardly projecting arm 40 which is connected by a link 41 to one arm of a bell crank 42 secured to the upper end of the standard 35. From the other arm of the bell crank 42 a link 43 extends backward to some stationary part of the tractor such as the boiler, being there secured in any suitable manner as to a bracket 44. For the purpose of permitting up and down movement of the forward end of the device the members 14 are provided adjacent the axle 11 with hinges 45.

In the operation of the device the guide wheel 34 is set in the last furrow turned by the plows and the guide wheels of the engine adjusted. The engine is then driven across the field, care being taken that the guide wheel 34 follows the last furrow accurately. It is to be observed that in turning corners with this device the bell crank, arm 40, and the links act to turn the caster wheels in the same direction as the guide wheels of the tractor. It is also to be noted that by reason of the fact that the shaft 19 is rotatable in the frame the guide wheel 34 will at all times rest in the furrow and in consequence will not place any strain upon said frame, this being further aided by the hinged construction of the main frame.

There has thus been provided a simple and efficient device of the kind described and for the purpose specified.

What is claimed, is,

1. An attachment for traction engines comprising a V-shaped frame having an opening in its apex, clamps on the ends of the legs of said frame to secure the frame to an axle, a brace bar connecting said legs intermediate their ends and provided with an opening therein alined with the opening in the apex of the frame, a shaft passing through said openings, collars on said shaft to hold the shaft in the frame, means to hold said collars in adjusted position on said shaft, a lateral member extending outward from the shaft, a caster wheel at the junction of said member and shaft, a second caster wheel at the outer extremity of said member and a diagonal brace between said member and shaft; in combination with means to positively turn said caster wheels in a horizontal direction when the frame is swung in a corresponding direction.

2. An attachment for traction engines comprising a V-shaped frame having an opening in its apex, clamps on the ends of the legs of said frame to secure the frame to an axle, a brace rod connecting said legs intermediate their ends and provided with an opening therein alined with the opening in the apex of the frame, a shaft passing through said openings, collars on said shaft to hold the shaft in the frame, means to hold said collars in adjusted position on said shaft, a lateral member extending outward from the shaft, a caster wheel at the junction of said member and shaft, a second caster wheel at the outer extremity of said member, and a diagonal brace between said member and shaft; in combination with a traction engine having a steering axle to which said V-shaped frame is attached; and with means to positively turn said caster wheels in a horizontal direction when the frame is swung in a corresponding direction.

In testimony whereof, I affix my signature, in presence of two witnesses.

WALTER MEACHAM.

Witnesses:
 THOS. E. KING,
 GEO. S. PERCY.